United States Patent Office 2,767,294
Patented Oct. 16, 1956

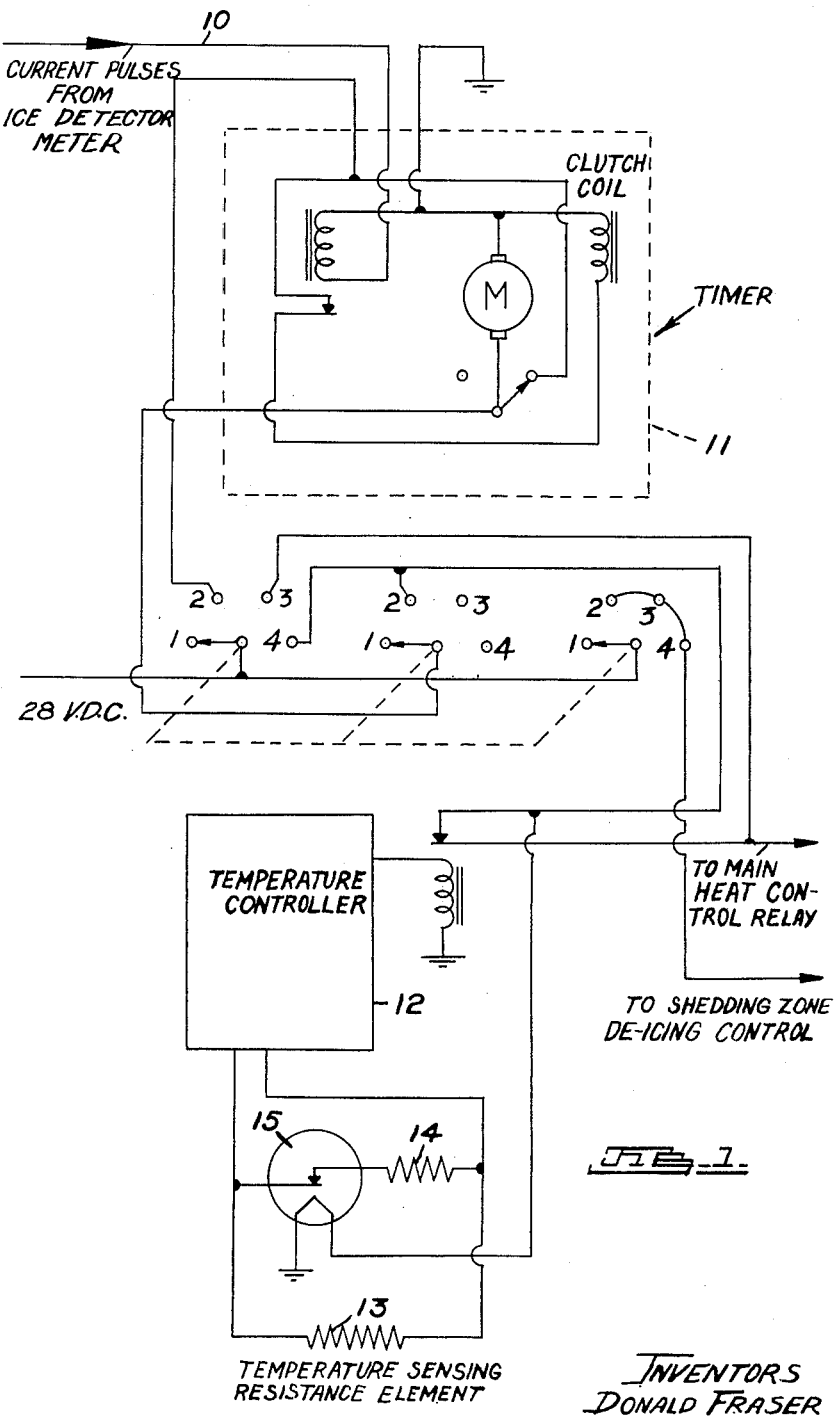

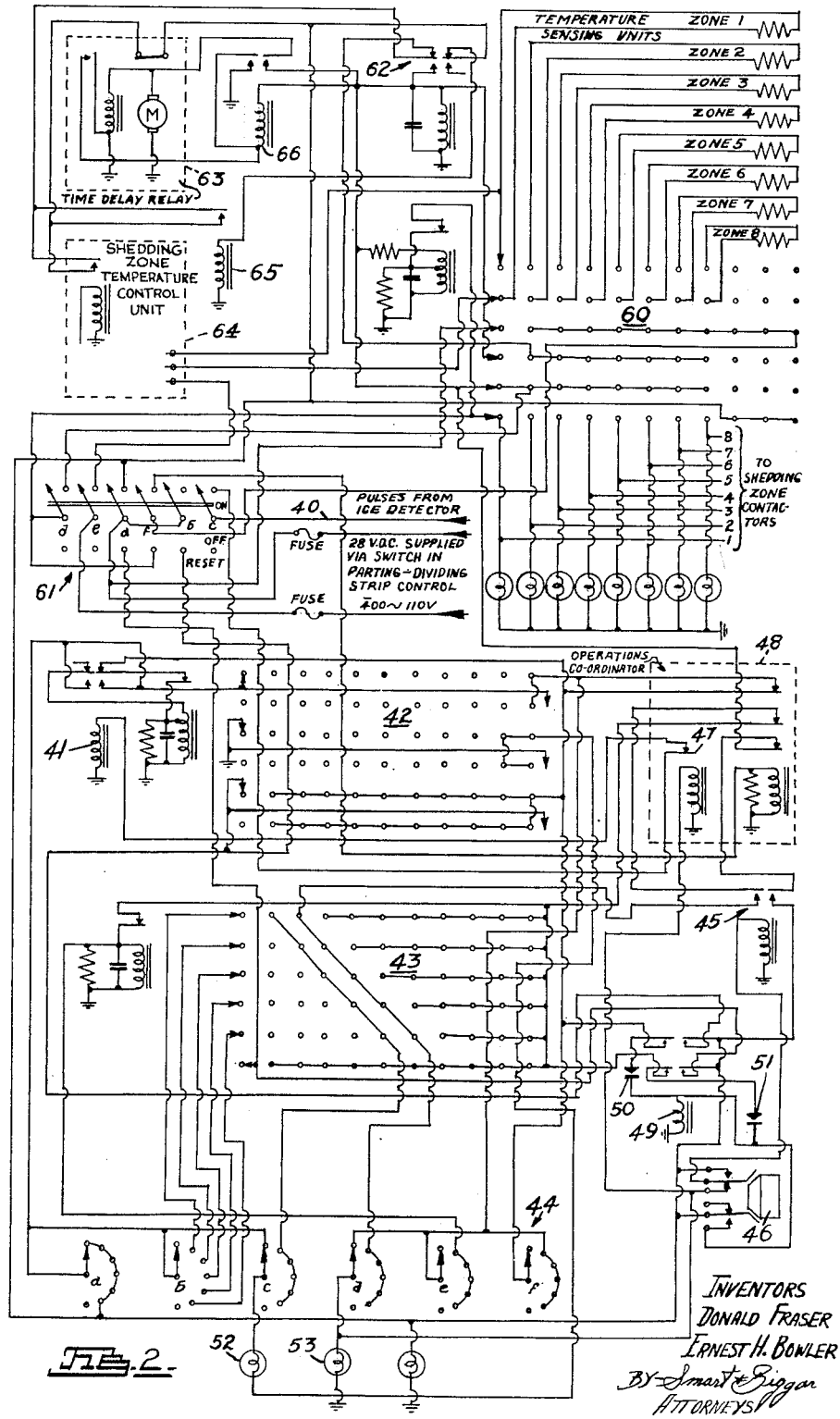

2,767,294

APPARATUS FOR CONTROLLING A THERMAL DE-ICING SYSTEM

Donald Fraser and Ernest H. Bowler, Ottawa, Ontario, Canada, assignors to National Research Council, Ottawa, Ontario, Canada, a body corporate Application November 12, 1954, Serial No. 468,516

Claims priority, application Canada November 25, 1953

4 Claims. (Cl. 219—20)

The invention relates to apparatus for controlling automatically thermal de-icing of a surface such as that of the wings of an aircraft.

A de-icing system ordinarily works on the principle that ice is allowed to form and then heat in the case of a thermal system, or in the case of some other systems fluid or mechanical force, is applied to loosen the adhesion of the ice and make it break off in the solid state. For efficient operation it is necessary that the de-icing action be applied when the right amount of ice for effective shedding has accreted. Prior to the present invention this has generally been a matter of visual observation and personal judgment on the part of the operator. The present invention provides automatic operation of a de-icing system and this is particularly desirable when circumstances render visual observation difficult or impossible.

Apparatus according to the present invention is arranged to be controlled by signals from any detector of icing conditions which provides electrical pulses such, for example, as the icing detector described in D. Fraser's United States patent application Serial No. 348,243, filed April 13, 1953, now United States Patent 2,724,106, issued November 15, 1955. However, a conventional icing-drag meter or any other type of ice accretion meter working on a cyclic principle may be used. A certain number of pulses from one of these types of detectors represents a certain amount of ice accretion so that when a specified or selectable count is reached the de-icing system may be put into operation. Apparatus in accordance with the present invention can control a cyclic type electro-thermal de-icing system in accordance with the information received from the ice detector as well as from temperature sensing elements located in a surface to be de-iced. The surface to be de-iced is arranged to have one or more parting strips along which the ice formed on the surface is to be divided, and one or more adjacent zones from which the ice is to be shed. Heat is applied to the parting strips at the first indication of icing conditions and when a predetermined amount of ice has accreted on the shedding zones these zones are then heated to loosen the adhesion of the ice and to allow aerodynamic or mechanical forces to remove the ice in the solid state. For efficient operation heat is applied to each shedding zone only until the ice has been shed. After an initiating signal has been received a cycling control automatically applies heat to each shedding zone in turn. The length of time during which heat is applied to each shedding zone is determined automatically by a temperature sensing element in the shedding zone but if desired this length of time can be selected manually.

Apparatus in accordance with the present invention comprises an ice detector adapted to provide electric pulses under icing conditions, a timer adapted and connected to be initiated for a predetermined time interval by a pulse from the detector and to be re-initiated by succeeding pulses, temperature control means for sensing the temperature of at least one parting strip of the surface to be de-iced, the temperature control means being energized by the timer during the predetermined time interval, a first heater located to heat the parting strip and arranged to be controlled by the temperature control means, a counter adapted and connected to count the pulses from the ice detector, a second heater located to heat at least one shedding zone adjacent to the parting strip, the second heater being arranged to be energized when the counter reaches a predetermined count to remain energized for either a predetermined time interval or until its temperature reaches a predetermined value.

The invention will be further described with reference to the attached drawings in which:

Figure 1 is a schematic wiring diagram of automatic parting and dividing strip control apparatus in accordance with the invention; and Figure 2 is a schematic wiring diagram of automatic shedding zone control apparatus in accordance with the invention.

The system shown in the drawings is arranged to control a cyclic type electro-thermal de-icing system in accordance with information from an orifice type ice detector (such as that shown in D. Fraser's United States patent application Serial No. 348,243, filed April 13, 1953 now United States Patent 2,724,106, issued November 15, 1955) and from temperature sensing elements in de-icing pads in the wings of an aircraft. This system is arranged to control two types of surfaces, namely the parting and dividing strips and the shedding zones.

The control for the parting and dividing strips is shown in the schematic wiring diagram of Figure 1. The first current pulse received from the ice detector (not shown) on the connection 10 initiates a preset time interval in the timer 11 during which power is made available for the operation of a temperature controller 12. Each succeeding pulse received on the connection 10 from the ice detector re-initiates the timer 11. Thus continuous power is available if the pulses keep arriving above a certain minimum rate. The temperature controller 12 senses the temperature of the parting strip by means of an embedded temperature-sensitive resistance element 13 having a positive temperature coefficient. During a preset interval of a thermal time delay switch 15, for example 30 seconds, immediately after application of voltage to the temperature controller 12 the temperature sensitive resistance element 13 is shunted by a resistor 14 via the thermal time delay switch 15. This enables the temperature controller 12 to bring the parting and dividing strips up to a higher temperature for an initial period (the first 30 seconds while the thermal delay switch 15 is closed) while still providing for switching off the power to the parting strips at the higher temperature. Thereafter the switching off point is the preset lower value.

The shedding zones require the type of control system shown in the schematic wiring diagram of Figure 2. This equipment consists basically of two units, the "off"-period controller and the "on"-period controller. Also, there is a system of interlinkages which for convenience are grouped and called "Operation Coordinator."

Referring to Figure 2, current pulses from the ice detector (not shown) are received on the connection 40 and operate a relay 41 causing a stepping switch 42 to advance one step per pulse. Upon reaching the last step (10 pulses) the stepping switch 42 resets itself and a stepping switch 43 is advanced one step. These two stepping switches 42 and 43 thus comprise a decade counter which is wired to make a contact at any chosen multiple of ten counts up to sixty. The multiple is selected by sections 44b, 44d and 44e of a switch 44. The chosen contact, when reached, energises a relay 45 which in turn initiates the "on"-period controller. The relay 45 can also be energised manually by a switch 46.

Relays 47 and 48 serve to cause the counter to dwell ("off"-period) at a completed count as required under certain conditions represented in the functions listed in the table (below). In addition, the relay 48 can hold up a re-initiating signal to the "on"-period controller until completion of an existing de-icing cycle; consequently the relays 47 and 48 are called the "Operations Coordinator."

The "off"-period controller consists of a counter (switches 42 and 43) and the operation coordinator (relays 47 and 48). The counter receives signals from the ice detector and when a selected number of signals have been received the counter transmits a signal to the operation coordinator to indicate this. The selected number of signals may vary from one to a large number. The appropriate number may be fixed or may be determined by a preset adjustment or may be selectable manually. The counter will also receive order signals from the operation coordinator. The operation of the operation coordinator is indicated in the table.

TABLE

| Information Signals from— | | Order Signals to— | |
|---|---|---|---|
| Counter | De-icing Control | Counter | De-icing Control |
| Yes (Count complete) | Yes (De-icing operation complete) | Yes (Re-start count) | Yes (Start fresh de-icing operation) |
| Do | No (De-icing operation incomplete) | No (Dwell on final count) | No (No effect) |
| No (Count not complete) | Yes (De-icing operation complete) | Yes (Carry on countering and re-start count when completed) | Do |
| Do | No (De-icing operation incomplete) | No (Carry on counting and dwell on final count) | Do |

If a Yes signal is received from the operation coordinator at the end of the required count, the counter will resume counting on a fresh cycle. If a No order signal is received, the counter will dwell at the final count until a Yes order is received. If the controller is switched off the counter will return to zero.

The operation coordinator receives information signals from both the counter and the de-icing controller, the de-icing controller being designed or modified as necessary to produce the required signals.

A Yes information signal from the counter signifies that the required count has been received. A No information signal signifies that the count has not been reached.

A Yes information signal from the de-icing controller signifies that the de-icing operation has been completed. A No information signal signifies that de-icing has not been completed.

The operation coordinator will also initiate order signals to the counter and to the de-icing controller.

A Yes order signal to the counter permits it to start recounting. A No order signal to the counter makes it dwell at the final count.

A Yes order signal to the de-icing controller starts it operating. A No order signal to the de-icing controller has no effect.

The following discussion will deal with the means by which the counter (switches 42 and 43), after initiating a deicing cycle, can proceed to count up to the preset count once again and then dwell until it can re-initiate the "on"-period controller. This feature is indicated by the functions listed in the table (above). Referring to Figure 2, the stepping switch resetting circuits are broken by the contacts on relay 48 when it is energised during de-icing. This dwell feature operates in conjunction with section 44f of the switch 44 as follows: When the selected count is ten the relay 48 holds the stepping switch 42 on position 10 until the already started de-icing cycle is completed and another can be started. When the count selected is greater than ten the stepping switch 43 is held when it reaches that count. However, the switching section 44f of the switch 44 shorts out the open reset contacts of the relay 48 so that the stepping switch 42 can continue to tally up the required number of tens. When the stepping switch 42 reaches the final count, the relay 47 is energised at the same time as the relay 45 and all further pulses from the icing detector are blocked.

The circuit shown in Figure 2 includes the following secondary features:

(a) A push button initiation of the shedding cycle and rezeroing by means of the switch 46 the relay 49 and selenium rectifiers 50 and 51;

(b) Warning lights 52 and 53 to indicate respectively two counts before completion and that the counter is dwelling.

The "on"-period controller, once initiated, switches power in turn to each of the shedding zones for one complete cycle, with the length of time on each being determined by its temperature. Safety features can be incorporated to protect the shedding zones and to ensure the continued cycle of power despite the failure of sections of the equipment.

The banks of a stepping switch 60 (Figure 2) perform the following functions:

Banks 1 and 2

Select the sensing element in the appropriate shedding zone.

Bank 3

(a) Sends back a continuous voltage signal to the Operations Coordinator while a cycle de-icing is proceeding.

(b) Makes possible the re-zeroing of the stepping switch 60 via the switch section 61f of the switch 61; the switch section 61d of the switch 61 breaks the normal stepping circuits for this operation.

Bank 4

Makes possible temperature controlled stepping as long as the stepping switch 60 is on one of the eight shedding zone positions.

Banks 5 and 6

(a) Provide power to the shedding zone contactors while the stepping switch 60 is on these positions.

(b) Supply stepping power to reset the stepping switch 60 after completion of de-icing steps.

The temperature controlling the stepping operates as follows: An initiating pulse from the operation coordinator energises a relay 62 and the stepping switch 60. The relay 62 holds itself and the stepping switch 60 energised via contacts in a time delay relay 63 and the common temperature control unit 64. When either of these latter contacts breaks, the relay 62 and the stepping switch 60 are momentarily deenergised. This causes the stepping switch 60 to step to the next position. The relay 62 is re-energised immediately via banks 4 and 5 of the stepping switch 60 and via its own contacts so that a new interval starts on the next shedding zone. With the step off the final shedding zone, bank 4 of the stepping switch 60 ceases to make power available for another initiation; banks 5 and 6 are now arranged to supply resetting power to the stepping switch 60.

Safety overrides are provided for such emergencies as may arise if the control relay in the temperature control unit 64 remains either open or closed on any shedding zone position. If the temepruture control unit remains open, which might be due to an open temperature sensing element, de-icing of the zone involved could be prevented as well as failure to step to the next section. In this case a relay 65 causes the stepping switch 60 to advance quickly to the next shedding zone. The contacts of the relay 65 parallel those of the relay in the temperature control unit 64. At the start of an interval they are closed by the momentary energisation provided by the action of the relay 62; because of the delay feature of this relay these contacts do not reopen immediately. When they do the stepping switch 60 advances as in normal operation even though the relay in the temperature control unit 64 has remained open continuously. The second type of failure, namely that of the relay in the temperature control unit remaining closed, which might be caused by a shorted temperature sensing element, could cause the burning out of a shedding zone as well as failure to step. The step in this case is brought after a preset maximum time by the opening of the contacts of the time delay relay 63. A relay 66 serves to actuate the time delay relay 63.

What we claim as our invention is:

1. Apparatus for controlling the de-icing of a surface having at least one parting strip along which it is desirable to part ice formed on said surface and having at least one ice shedding zone adjacent to said parting strip, comprising an ice detector adapted to provide electric pulses under icing conditions, a timer adapted and connected to be initiated for a predetermined time interval by a pulse from said detector and to be reinitiated by succeeding pulses, temperature control means for sensing the temperature of at least one said parting strip, the temperature control means being energized by said timer during said predetermined time interval, a first heater located to heat said parting strip and connected to be controlled by the temperature control means, a counter adapted and connected to count the pulses from said ice detector, a second heater located to heat at least one said shedding zone, the second heater being connected to be energised when said counter reaches a predetermined count and to remain energized for either a predetermined time interval or until the temperature of the shedding zone reaches a predetermined value.

2. Apparatus as claimed in claim 1 for a surface having a plurality of parting strips with adjacent shedding zones, said apparatus comprising means adapted to cycle energising power in turn to each of the heaters of said shedding zones.

3. Apparatus as claimed in claim 1 in which the temperature control means for sensing the temperature of a parting strip comprises a temperature-sensitive resistance element embedded in said strip, a resistor for shunt connection across said resistance element, and means for so shunt connecting said resistor for a predetermined time interval immediately after energisation of the temperature control means.

4. Apparatus as claimed in claim 2 in which the temperature control means for sensing the temperature of a parting strip comprises a temperature-sensitive resistance element embedded in said strip, a resistor for shunt connection across said resistance element, and means for so shunt connecting said resistor for a predetermined time interval immediately after energisation of the temperature control means.

References Cited in the file of this patent

UNITED STATES PATENTS

| | | |
|---|---|---|
| 2,182,530 | Baer | Dec. 5, 1939 |
| 2,510,041 | Rudahl | May 30, 1950 |
| 2,590,944 | Cowdrey et al. | Apr. 1, 1952 |
| 2,627,012 | Kinsella et al. | Jan. 27, 1953 |
| 2,656,525 | Kinsella | Oct. 20, 1953 |
| 2,675,456 | Cleminson et al. | Apr. 13, 1954 |
| 2,724,106 | Fraser | Nov. 15, 1955 |